(12) United States Patent
Baer et al.

(10) Patent No.: US 10,992,718 B2
(45) Date of Patent: Apr. 27, 2021

(54) METHODS FOR PROVIDING CONTINUITY IN CHATBOT COMMUNICATIONS

(71) Applicant: Telia Company AB, Solna (SE)

(72) Inventors: Anders Baer, Arsta (SE); Maria Jernström, Vega (SE)

(73) Assignee: Telia Company AB, Solna (SE)

( * ) Notice: Subject to any disclaimer, the term of this patent is extended or adjusted under 35 U.S.C. 154(b) by 175 days.

(21) Appl. No.: 15/883,053

(22) Filed: Jan. 29, 2018

(65) Prior Publication Data
US 2018/0219921 A1 Aug. 2, 2018

(30) Foreign Application Priority Data
Jan. 31, 2017 (SE) .................... 1750076-0

(51) Int. Cl.
| H04L 29/06 | (2006.01) |
| H04L 12/58 | (2006.01) |
| H04L 12/26 | (2006.01) |
| G06F 15/16 | (2006.01) |

(52) U.S. Cl.
CPC ...... H04L 65/1069 (2013.01); H04L 43/0852 (2013.01); H04L 51/02 (2013.01); H04L 51/046 (2013.01); H04L 51/16 (2013.01)

(58) Field of Classification Search
CPC ... H04L 65/1069; H04L 51/046; H04L 51/16; H04L 51/02; H04L 43/0852; H04L 41/5093; H04L 41/026; H04L 67/145; G06F 16/00; G06F 15/167; G06F 13/14; H04W 4/12
USPC ........................................................ 709/227
See application file for complete search history.

(56) References Cited

U.S. PATENT DOCUMENTS

| 7,181,492 | B2 | 2/2007 | Wen et al. |
| 7,779,079 | B2 | 8/2010 | Nichols et al. |
| 8,296,380 | B1 * | 10/2012 | Kelly ................... G06Q 10/107 709/206 |
| 8,645,547 | B1 * | 2/2014 | Jain ................... G06F 16/24552 709/227 |
| 9,094,519 | B1 * | 7/2015 | Shuman ............. H04L 65/1069 |
| 9,559,993 | B2 | 1/2017 | Palakovich et al. |
| 9,641,470 | B2 | 5/2017 | Smullen et al. |
| 10,237,236 | B2 * | 3/2019 | Moore ................... H04L 65/60 |
| 2004/0098609 | A1 * | 5/2004 | Bracewell ............. H04L 63/068 726/6 |

(Continued)

OTHER PUBLICATIONS

Office Action dated Aug. 20, 2019, Swedish Patent Application No. 175-0076-0 (priority), Swedish Patent and Registration Office.

*Primary Examiner* — David R Lazaro
*Assistant Examiner* — Berhanu Shitayewoldetadik
(74) *Attorney, Agent, or Firm* — Burr & Forman LLP; Jeffrey H. Kamenetsky

(57) ABSTRACT

The embodiments herein relate to a method in a user device and a method in a chatbot capable framework for providing continuity in chat communications between the user device and the chatbot capable framework. The method in the user device comprises: establishing a session with the chatbot framework over a first chat platform associated with a first chat application; starting a dialogue with the framework; initiating a transfer of the dialogue to a second chat platform associated with a second chat application and initiating a new session with the framework over the second chat platform and inputting identification information for continuing the dialogue where it stopped at the first chat platform.

18 Claims, 9 Drawing Sheets

(56) References Cited

U.S. PATENT DOCUMENTS

| | | | |
|---|---|---|---|
| 2005/0268107 A1* | 12/2005 | Harris | H04L 63/0861 713/182 |
| 2008/0114832 A1* | 5/2008 | Bellinger | H04L 41/5003 709/203 |
| 2008/0307038 A1* | 12/2008 | Nichols | G06Q 10/107 709/203 |
| 2009/0259588 A1* | 10/2009 | Lindsay | G06Q 20/102 705/40 |
| 2011/0138458 A1* | 6/2011 | Kumar | H04L 67/24 726/15 |
| 2011/0225248 A1* | 9/2011 | Boyer | H04L 51/046 709/206 |
| 2012/0303425 A1* | 11/2012 | Katzin | G06Q 20/32 705/14.4 |
| 2013/0129076 A1* | 5/2013 | Kannan | H04M 3/5141 379/265.09 |
| 2013/0346886 A1* | 12/2013 | Cauchois | H04L 51/046 715/758 |
| 2014/0181934 A1* | 6/2014 | Mayblum | H04L 51/36 726/7 |
| 2014/0201377 A1* | 7/2014 | Kadishay | H04L 65/1093 709/227 |
| 2014/0237057 A1* | 8/2014 | Khodorenko | H04L 51/32 709/206 |
| 2014/0245031 A1* | 8/2014 | Hamdi | G06F 1/3209 713/300 |
| 2015/0106887 A1* | 4/2015 | Aslund | H04W 12/06 726/5 |
| 2015/0229770 A1* | 8/2015 | Shuman | H04M 3/54 379/211.02 |
| 2015/0324908 A1* | 11/2015 | Starikova | G06Q 40/02 705/38 |
| 2016/0099892 A1 | 4/2016 | Palakovich et al. | |
| 2016/0149839 A1* | 5/2016 | Yi | H04L 67/1095 709/206 |
| 2016/0284031 A1 | 9/2016 | Quon et al. | |
| 2016/0294739 A1* | 10/2016 | Stoehr | G06Q 30/0269 |
| 2017/0012907 A1* | 1/2017 | Smullen | H04L 51/046 |
| 2019/0141399 A1* | 5/2019 | Auxer | H04N 21/4753 |

* cited by examiner

METHODS FOR PROVIDING CONTINUITY IN CHATBOT COMMUNICATIONS

TECHNICAL FIELD

The present disclosure relates to the field of data communications, and in particular to a user device, a chatbot capable framework and methods for providing continuous chatbot communications over chat platforms such as messaging platforms.

BACKGROUND

Chatbots are becoming increasingly popular as an interactive medium for the provision of information. A chatbot is a computer or software agent designed to have conversations with human correspondents. A chatbot is also called an "internet bot", a "web robot", a "www robot" or simply a "bot", a virtual assistant, a virtual client etc. The computer agent or bot, by means of a processor, includes an application that runs automated tasks (e.g., scripts) over one or several platforms. In a simple example, a chatbot performs tasks that are both simple and have structurally repetitive, at a higher rate that would be possible for a human being alone. Chatbots for different chat applications can be developed using a chatbot framework. The bot logic is created once and then deployed to the chatbot platform of choice. A chat platform API (Application Programming Interface) may vary in functionality available for the chatbot framework and the bot needs to be designed for the chat platform.

Given the exceptional speed with which chatbots can perform the relatively simple routines, chatbots may also be implemented where a response speed is faster than of what is required by a human, typically customer service/support or, e.g., finding if a product is in stock. While chatbots are often used to simply automate a repetitive online interaction with a user or human, their ability to mimic actual human conversation for users using a chat platform (e.g., messaging service) or spoken language has made them popular since users often want or require answers directly and quickly without waiting in line or in queue which is often the case when calling a company support center.

With today's technologies, a user may have access to chat platforms and associated chatbots from a plurality of devices, such a laptop, a PC, a mobile device etc. Also the number of chat platforms are many within one and the same device, and each associated chatbot operates within a specific platform. In other words, if a user starts a conversation with a chatbot within a platform and for some reason wants to switch to another platform, the conversation will have to be restarted again within the second platform. This is cumbersome for the user and leads to excessive delays in, e.g., solving a problem via a chatbot. In other words it is not possible today to move the conversation with the chatbot or web bot from one chat platform or messaging service to another.

A parallel would be that two humans beings are communicating over a fixed telephone line and the line for some reason stops working. One party then may use his/her mobile phone to re-initiate the communication dialogue to the other party. The communication dialogue would then continue where it was left and not need to start over again.

SUMMARY

It is an object of embodiments herein to solve the above problems by providing a user device, a chatbot capable framework and methods for continuous chatbot communications when the user of the device selects to switch from one chat platform to another chat platform thereby avoiding delays in the chatbot communication.

According to an aspect of embodiments herein, there is provided a method for providing continuity in chat communications between a user device and a chatbot capable framework in a network, the method comprising: the user device establishing a session with the chatbot capable framework over a first chat platform associated with a first chat application, and starts a dialogue with the chatbot capable framework; the framework storing a state of the session in a database, wherein the session state includes identification information identifying the ongoing dialogue; the user device initiating a transfer of the dialogue to a second chat platform associated with a second chat application. The method further comprises: the framework retrieving, from the database, the previously stored identification information, and providing the user device with the identification information over the first chat platform; and the user device initiating a new session with the chatbot capable framework over the second chat platform associated with the second chat application, and the user device inputting the identification information for continuing the dialogue where it stopped at the first chat platform.

According to another aspect of embodiments herein, there is provided a method for providing continuity in chat communications between a user device and a chatbot capable framework in a network, the method comprising: the user device generating an identification information from a user id, together with a user defined text string; the user device establishing a session with the chatbot capable framework over a first chat platform associated with a first chat application, and starts a dialogue with the chatbot capable framework; the framework storing, in a database, a state of the session together with the generated identification information and the user id; the user device initiating a transfer of the dialogue to a second chat platform associated with a second chat application. The method further comprises: the framework retrieving the stored identification information associated with the dialogue; the user device initiating a new session with the framework over the second chat platform associated with the second chat application, and inputs the user defined text string; and the framework identifying the inputted text string and relates that with the stored user id, for allowing the dialogue to continue where it stopped at the first chat platform.

According to another aspect of embodiments herein, there is provided user device and a method performed by the user device, for providing continuity in chat communications between the user device and a chatbot capable framework in a network, the method comprising: establishing a session with the chatbot capable framework over a first chat platform associated with a first chat application, and starting a dialogue with the chatbot capable framework; initiating a transfer of the dialogue to a second chat platform associated with a second chat application; initiating a new session with the chatbot capable framework over the second chat platform associated with the second chat application, and inputting identification information for continuing the dialogue where it stopped at the first chat platform.

There is also provided a chatbot capable framework and a method performed by the framework for providing continuity in chat communications with a user device in a network, the method comprising: establishing a session with a user device over a first chat platform associated with a first chat application and starting a dialogue with the user device;

storing at least a state of the session in a database, wherein the session state includes identification information; establishing a new session with the user device over a second chat platform associated with a second chat application, wherein the new session is established after the user device or the chatbot capable framework initiated transfer of the dialogue from the first chat platform to the second chat platform; and allowing continuation of the dialogue with the user device over the second chat platform when an identifier or a text string received from the user device is determined to be valid.

An advantage with embodiments herein is to maintain the communication topic with a bot (or chatbot) even though a user switches communication chat platform, but still can continue the communication at the stage the dialogue has reached.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
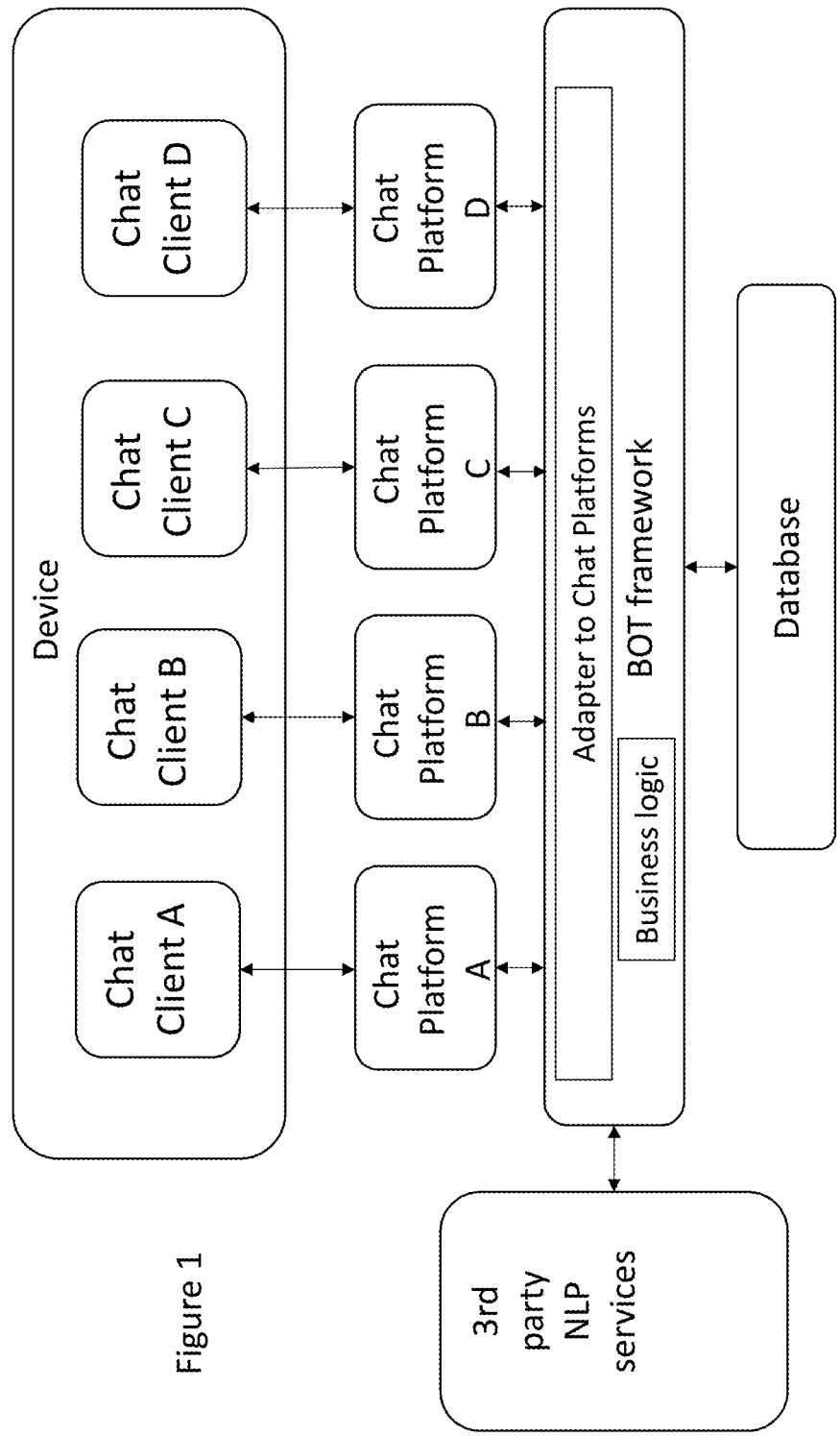
FIG. 1 illustrates a schematic overview of bot platforms.

Referring to FIG. 1, there is illustrated a schematic block diagram showing bot platforms. In general, a bot (or chatbot) logic is hosted by a "bot framework" that has so called "web hooks" on an API for supported chat platform(s). In general, a web hook allows the bot framework to interact with the user and also be able to use third party sources to utilize NLP (Natural Language Processing) platforms to add intelligence to the bot communication logic. As shown in FIG. 1, a device may comprise a plurality of chat clients denoted chat client A, B, C and D. Each chat client may interface with a respective chat platform (chat platform A, B, C, D respectively). Third party ($3^{rd}$) party NLP services may also interact with the bot framework via an adapter to chat platforms A, B, C, D. A database is also shown interfacing with the adapter and also a business logic.

Figure 2:
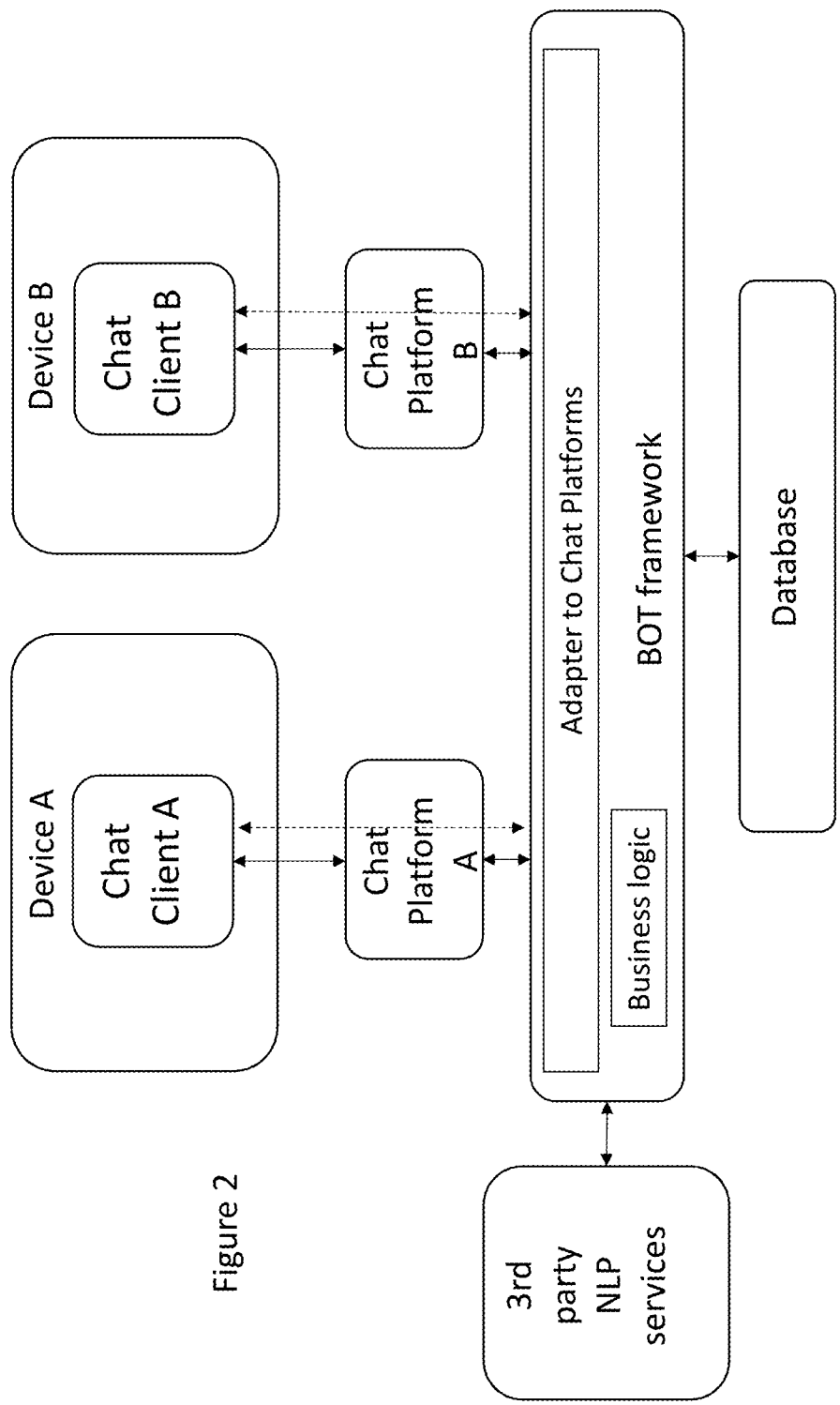
FIG. 2 is another schematic overview of a bot dialogue transfer.

FIG. 2 illustrates another example of a bot dialogue transfer. Here two devices are shown (Device A and Device B) each interfacing with a respective chat platform (A, B respectively). The dashed arrows from a device to the bot framework represents a bot dialogue transfer passing via respective chat platform. In this example, each device is provided with a chat application but with different techniques or suppliers. The dashed arrows show a possibility to create an interaction to make it possible to transfer and continue chat dialogues between different chat platforms. For example, a user of device A initiates transfer of an ongoing session or dialogue between chat client A over chat platform A by typing a command or clicking a button. The bot framework or business logic responds with a code valid for another chat platform for chat client B of device B, and the user of device B initiates a new session with chat client B, inputs the code received earlier and can thereafter continue the dialogue where it stopped. Additional details will be exemplified below.

As previously described, a problem with bots is that they operate within their chat platform meaning that for a bot that is constructed on, e.g., Facebook®, it will mandate that the user keeps the whole communication within Facebook®. This is a problem for users that have multiple devices from different vendors using different techniques to support applications on top of those. For example, a user that starts a communication over a specific communication channel, e.g., application X, on a computer and then have to move away from the computer and by that "transfer" the communication to another device (e.g., a mobile phone) may not be possible because the application X may not be supported, or, if it is supported by the other device, the communication is interrupted and needs to be restarted again.

According to embodiments herein, there is provided a solution that allows users to choose the communication (chat) platform of their choice while communicating with a (chat) bot by bridging the chat platform communication with the users in order to maintain continuity in the chatbot communications. Hence, for a user that is communicating with a chatbot, the solution addresses to maintain the dialogue (or communication) topic with a bot even though the user switches communication chat platform from a previous chat platform to a new chat platform but still continue the dialogue where it stopped at the previous chat platform. In other words, the solution allows a user that started a dialogue on chat platform A that supports a bot service, to transfer and continue the dialogue with the bot service on chat platform B at the logic where the user left chat platform A.

It should be mentioned that the embodiments herein may employ NLP to add intelligence to the bot communication logic.

Figure 3:
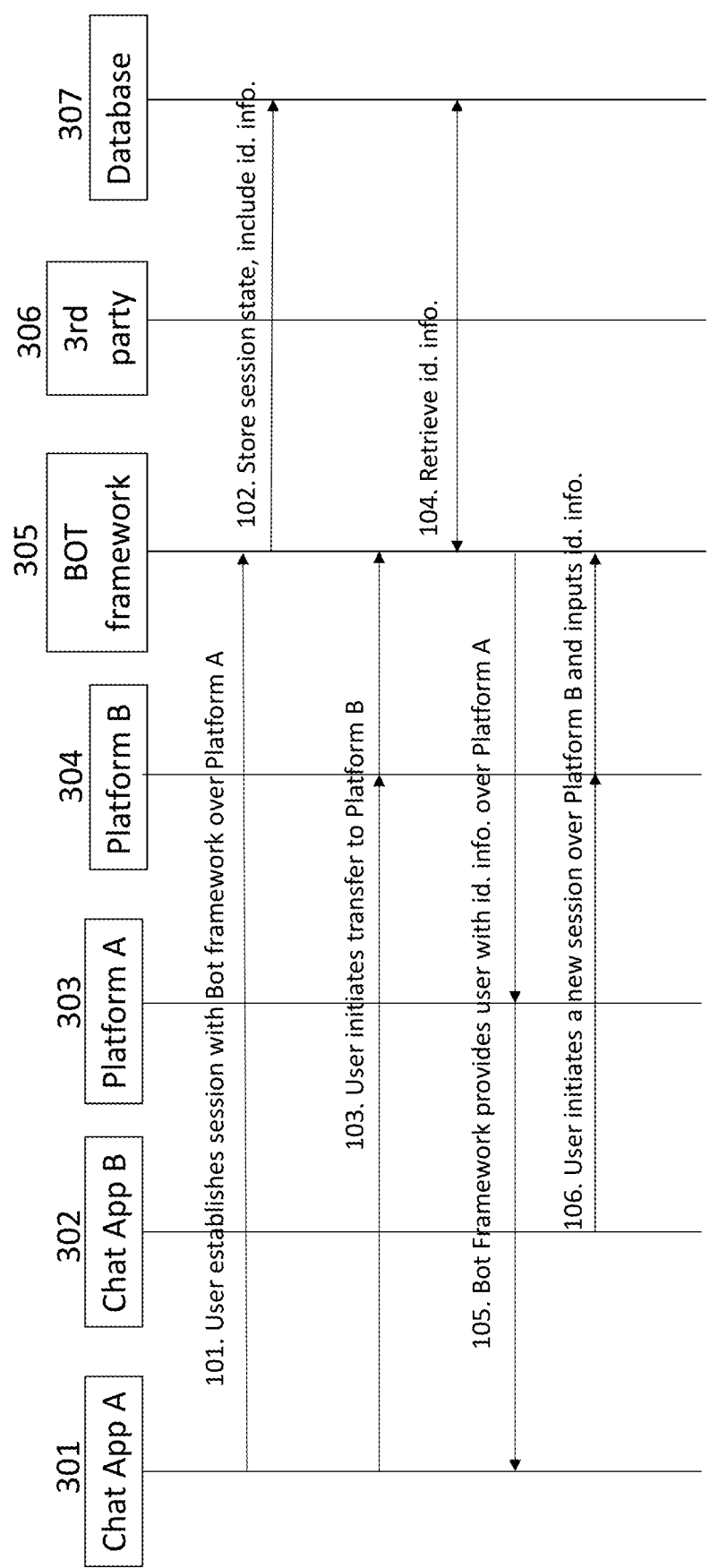
FIG. 3 is an example of a diagram depicting a transfer of a dialogue according to an embodiment herein.

Referring to FIG. 3 there is illustrated an example of a method (or diagram) for providing continuity in chat communications between a user device and a chatbot capable framework according to an embodiment herein. The diagram shows how a transfer of a dialogue from one of a first chat platform to a second chat platform is performed.

It is here assumed that a user device hosts chat application A 301 and chat application B 302. It should be mentioned that the user may have several devices, e.g., a PC hosting chat application A, and a mobile device hosting chat application B. To each chat platform is associated a chat application. Here, the first chat application platform, denoted Platform A 303, is associated with the first chat application A 301. The second chat application platform, denoted Platform B 304, is associated with the second chat application B 302. A chat platform may be viewed as a chat supported application, e.g., a messaging platform with APIs that can be hooked into for a chatbot logic to use.

The figure also shows a chatbot capable framework 305, a $3^{rd}$ party service (e.g., NLP service) (optional) 306 and a database 307. The chatbot capable framework 305 may be executed by a processor of an (application) server or a set of servers in a network.

The actions performed include:

(101) The user (device) establishing, using chat application A, a session with the chatbot capable framework 305 over chat platform A that is associated with chat application A. The user also starts a dialogue with the bot framework 305 on a chosen topic.

(102) The bot framework 305 storing a state of the session in database 307, wherein the session state includes identification information (id. info.) identifying the ongoing dialogue. The id. information may be generated or constructed by the bot framework 305. The identification information includes an identifier that, if determined to be valid, will make it possible to identify one or more sessions or dialogues that are to be continued. The identification information may include a user id., timestamp, message sequence id, contextual information regarding a content of the dialogue, a timer for validity indicating how long a session is valid to be picked-up again before removed etc. The identification information may be constructed with a crypto hash to create a unique identifier.

It should be mentioned, that the whole chat transcript or content of the dialogue or session is continuously stored for the validity of the session. This allows the dialogue to be resent to the user if needed to be "reloaded" as history of what has been sent to, e.g., another device of the user.

(103) The user (device) initiating a transfer of the dialogue to the second chat platform, platform B 304. This may be performed by the user typing a command or by clicking a button that resides in the bot logic of the bot framework 305 for chat platform A 303.

(104) The bot framework 305 retrieving from the database the stored id. information.

(105) The bot framework 305 providing the user device, over chat platform A 303, with the id. information that corresponds to the ongoing dialogue.

(106) The user (device) then initiating a new session over chat platform B 304 associated with chat application B 302, and inputs the id. information received earlier for continuing the dialogue where it stopped at the chat platform A 303. For example, the user may input a command, click a button, copy and paste a code or scanning a Quick Response (QR) code etc.

Figure 4:
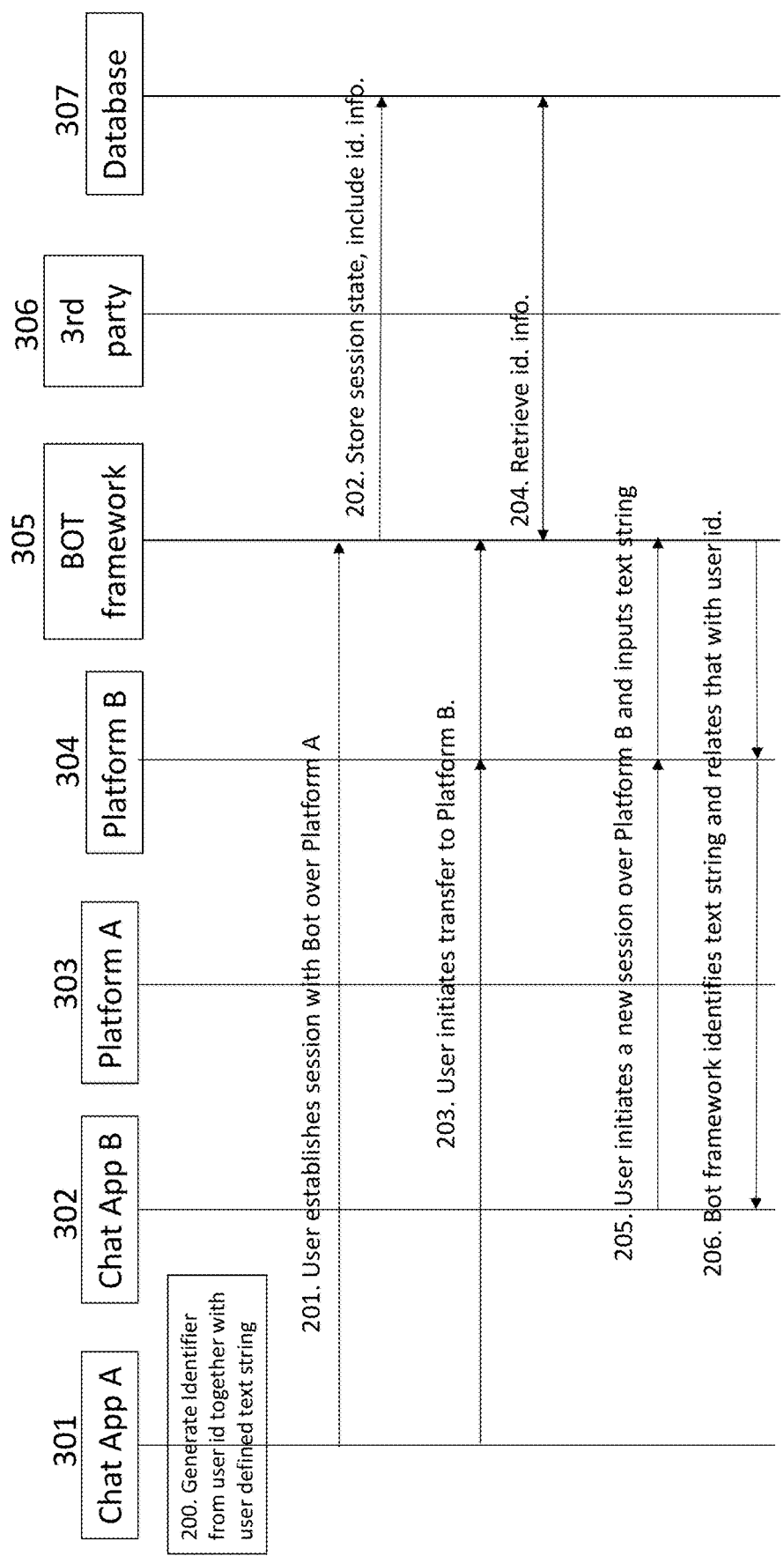
FIG. 4 is an example of a diagram depicting a transfer of a dialogue according to another embodiment herein.

Referring to FIG. 4 there is illustrated another example of a method or diagram explaining how a dialogue transfer may be performed according to another embodiment herein. In this case, a user of the device is allowed to use a defined text string to transfer the ongoing dialogue from one chat platform to another chat platform using a combination of a (unique) user id and an "easy to remember" text string.

The actions performed include:

(200) The user device generating an identification information (id. info.) from a user id together with a user defined text string. The generated identifier may be displayed or presented to the user.

(201) Similar to the previous embodiment, the user (device) establishing, using chat application A 301, a session with the bot capable framework 305 over chat platform A 303 that is associated with chat application A 301. The user device also starts a dialogue with the bot framework 305 on a chosen topic.

(202) The bot framework 305 storing a state of the session in database 307 together with the generated identification information (id. info.) and the user id.

(203) The user (device) initiating a transfer of the dialogue to the second chat platform, platform B 304. This may be performed by the user typing a command or by clicking a (visual) button that resides in chat application A 301. The user may also enter the generated identifier. By this, the bot framework 305 is notified.

(204) The bot framework 305 retrieving from the database the stored id. info related to the ongoing dialogue.

(205) The user device initiating a new session over chat platform B 304 associated with chat application B 302, and inputs the chosen user defined text string.

(206) The bot framework 305 identifying the text string and relates that to the user id. and allows the ongoing dialogue to continue over chat platform B 304 where it stopped at chat platform A 303. This way, continuity in chat communications is achieved or provided.

According to an embodiment, the database 307 includes, as previously described, the session state, identification information but also user id, sequence id of messages related to the ongoing dialogue, timestamp(s), sequence id(s) etc. The uniqueness for a dialogue transfer is thus achieved through combining a set of parameters and could then be constructed as a predefined value that is reusable for the user every time a transfer is wanted, or generated each time the user initiates a transfer. The identification information may be constructed with a crypto hash to create a unique identifier.

When transferring an ongoing dialogue from chat platform A 303 to chat platform B 304 the user may input the identifier (or identification information) that has been generated to identify the dialogue of interest.

Figure 5:
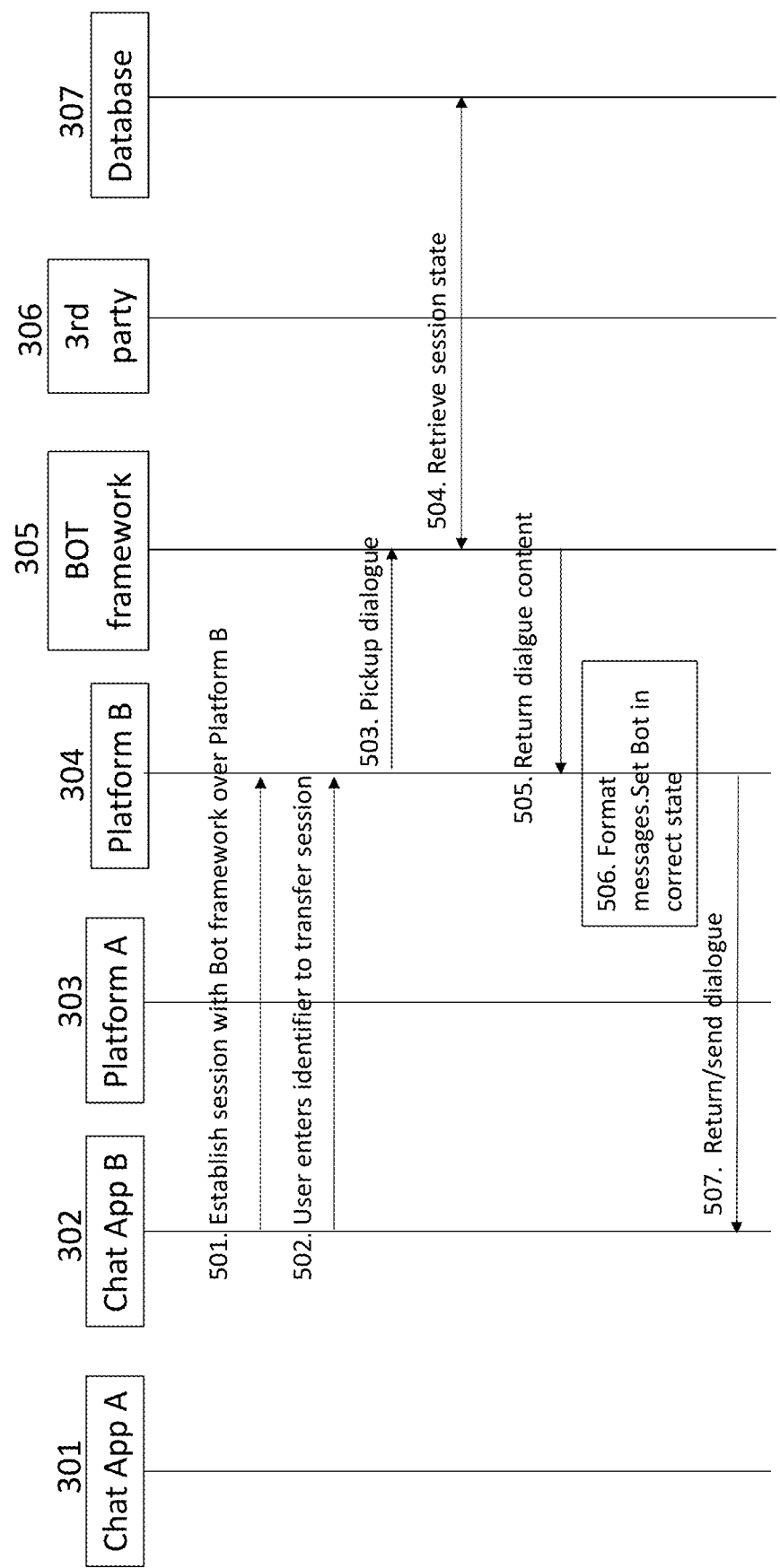
FIG. 5 illustrates an example scenario on how to retrieve a dialogue, according to an exemplary embodiment herein.

FIG. 5 illustrates an example scenario on how to retrieve a dialogue, according to an exemplary embodiment herein.

The actions performed include:

(501) The user (device) establishes a session with bot framework 305 over platform B 304. Here the user has opened chat application B and wishes to retrieve a dialogue.

(502) The user provides the transfer identification information or identifier which may be the identifier received earlier from the bot framework 304 or the identifier generated by the user device or credentials (username, password) or date-time of dialogue to pick up etc.

(503) The bot framework 305 picks up or retrieves the dialogue or session by using the (unique) identifier as key.

(504) The bot framework 305 retrieves from the database 307 the previously stored session state related to the dialogue.

(505) The bot framework 305 may adapt the message(s) or content of the dialogue to a preferred chat platform (here platform B) and the bot framework 305 returns said content to platform B 304.

(506) Platform B 304 may format received messages or content of the dialogue to be adopted to the format supported by chat application B 302. The bot framework may also be set in a correct state.

(507) Platform B 304 sends the dialogue requested by the chat application B 302 of the user. A message of a dialogue may be limited to a predefined number of characters e.g. 2000.

To transfer an ongoing dialogue without inputting an identifier at the time of the transfer, the user device may predefine its user id(s) related to supported chat platforms. An advantage here is that less input is needed when picking up the ongoing dialogue from another chat platform.

Figure 6:
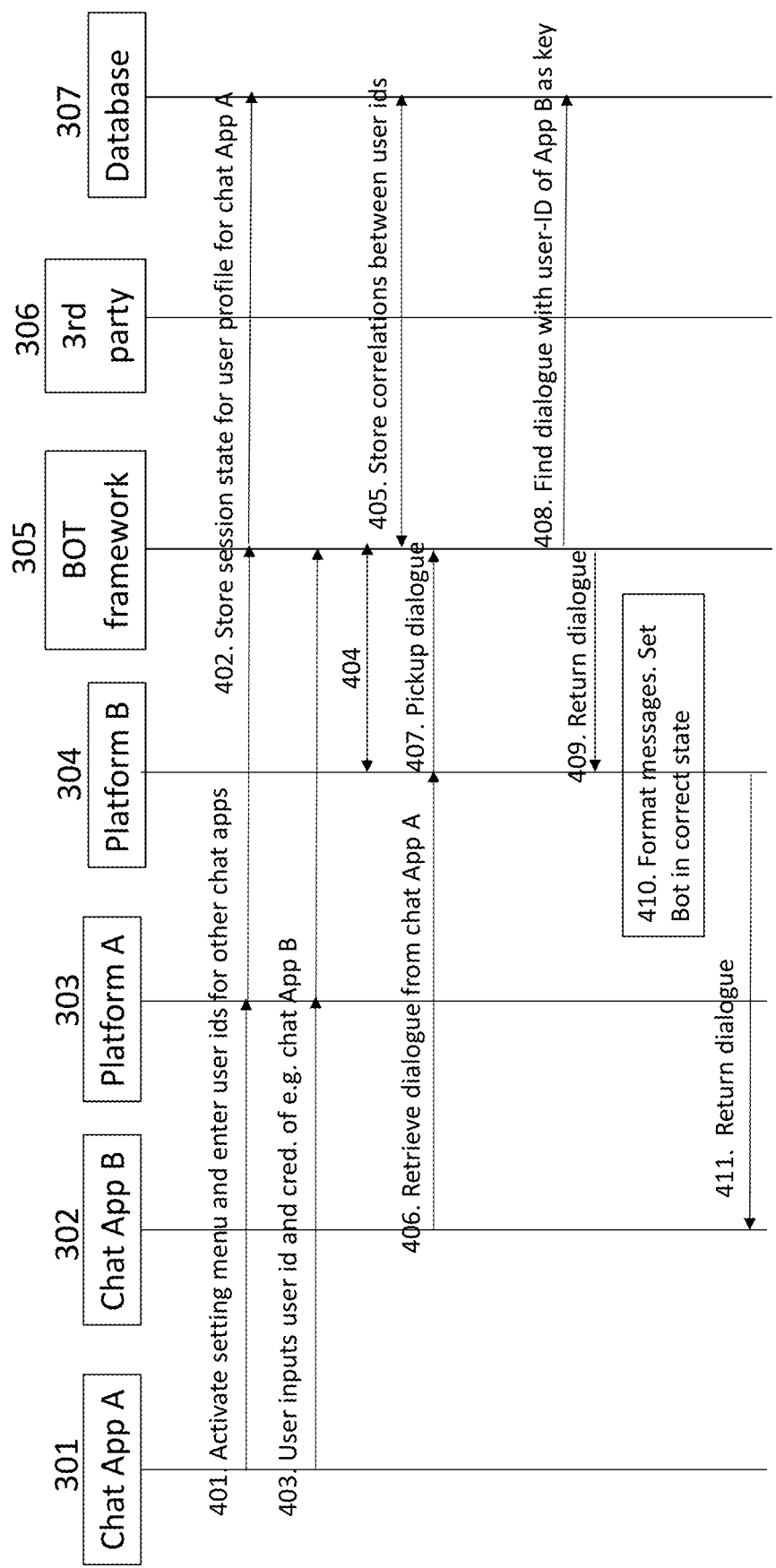
FIG. 6 illustrates an example scenario on how to retrieve a dialogue, according to another exemplary embodiment herein.

FIG. 6 depicts an exemplary diagram when retrieving a dialogue using a predefined user identification according to an embodiment herein.

(401) The user (device) establishes a session with the chatbot framework 305 using chat application A 301 over chat platform A 303. The user may activate a setting menu and input user identities (or credentials) for other chat applications that could be used (e.g., chat application B, C, etc.). The activation may be performed with a predefined command, e.g., "show settings," "show menu" that the user types or enters.

(402) The user id (or user profile) for chat application A is stored in the database 307 together with the session (or session state).

(403) The user inputs user id and credentials of the chat application of interest (here chat application B 302).

(404) The bot framework 305 validates that the inputted credentials are correct towards chat platform B.

(405) The bot framework 305 also stores the correlations between the user ids in the database 307. In this case, the correlation of user-ID for application B to application A is stored.

(406) The user, by means of application B 302 and over chat platform B 304, starts a dialogue and can retrieve a dialogue that was started on the previous chat application (chat application A 301) with the bot framework.

(407) The retrieved request is forwarded from chat platform B 304 to bot framework 305 for retrieving or picking up the latest dialogue.

(408) The bot framework 305 requests to find the dialogue by providing to the database 307 user-ID for chat application B 302 as a key.

(409) The bot framework 305 returns the dialogue content or state to chat platform B 304.

(410) Platform B 304 may format received messages or content of the dialogue to be adopted to the format supported by chat application B 302. The bot framework 305 may also be set in a correct state.

(411) Platform B 304 sends the dialogue requested by chat application B 302 of the user. Hence, the dialogue state from where the user left chat application A is returned, now on chat application B and hence can continue where it was stopped.

Figure 7:
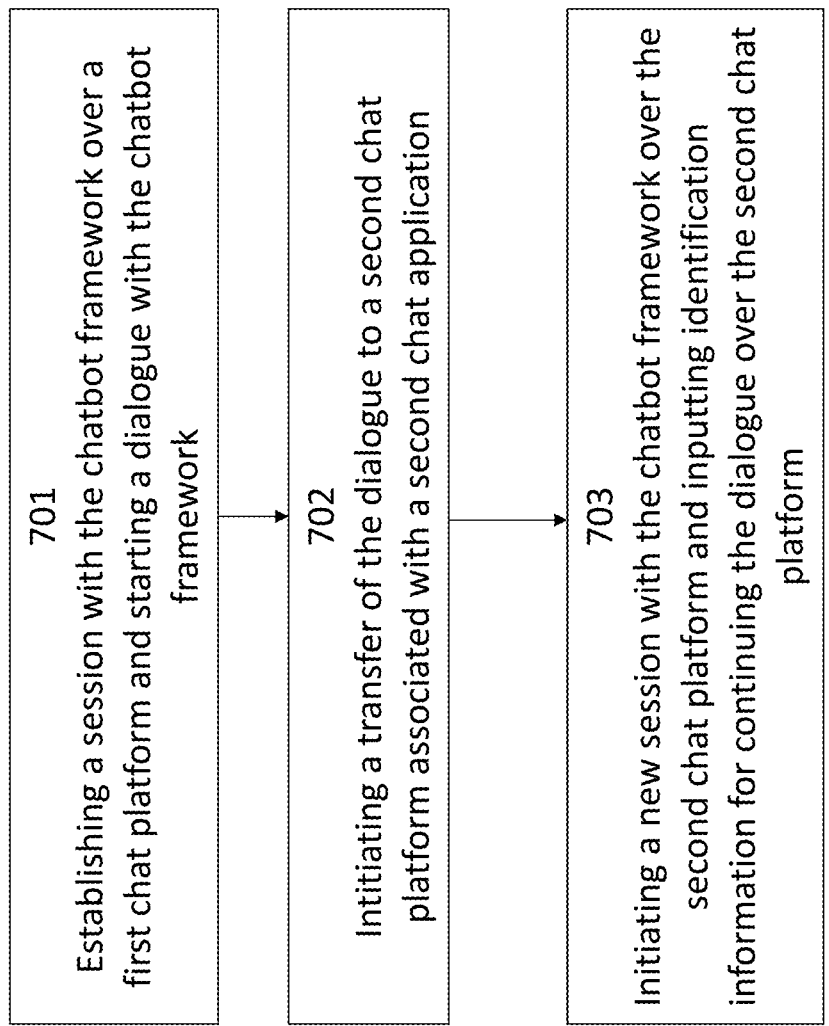
FIG. 7 illustrates a flowchart of a method performed by a user device according to an embodiment herein.

Referring to FIG. 7 there is depicted a flowchart of a method performed by a user device for providing continuity in chat communications in a network according to previously described embodiments. The main steps of the method comprise:

(701) establishing a session with the chatbot capable framework 305 over a first chat platform 303 associated with a first chat application 302, and starting a dialogue with the chatbot capable framework 305;

(702) initiating a transfer of the dialogue to a second chat platform 304 associated with a second chat application 302;

(703) initiating a new session with the chatbot framework 305 over the second chat platform 304 associated with the second chat application 302, and inputting identification information for continuing the dialogue where it stopped at the first chat platform.

As previously described, the identification information may be generated or constructed by the chatbot framework 305 and provided to the user device. Alternatively, the identification information is generated by the user itself e.g. a text string.

According to an embodiment, the user device provides user id or credentials required by the second chat application 302 for retrieving the dialogue from the framework 305 over the second chat platform 304. The bot framework 305 retrieves the dialogue from the database 307 and returns it to the second chat platform 304 which in turn returns it to the second chat application 302 of the user device.

There is also provided a user device for performing the method steps described herein for providing continuity in chat communications between the user device and a chatbot capable framework 305 in a network. The user device comprising a processor and a memory, said memory containing instructions executable by the processor wherein the user device is operative to or configured to: establish a session with the chatbot capable framework 305 over a first chat platform 303 associated with a first chat application 301, and start a dialogue with the chatbot capable framework 305; initiate a transfer of the dialogue to a second chat platform 304 associated with a second chat application 302; and initiate a new session with the chatbot capable framework 305 over the second chat platform 304 associated with the second chat application 302, and inputting identification information for continuing the dialogue where it stopped at the first chat platform 303.

The user identification information includes a unique identifier identifying the ongoing dialogue, and identification information may be retrieved from the chatbot capable framework 305.

Alternatively, the identification information is generated by the user device and includes at least a user defined text string. The user device is further configured to provide user id or credentials required by the second chat application 302 for retrieving the dialogue from the framework 305 over the second chat platform 303. The user device may be a mobile phone, a PC, a laptop, a smartphone or any device capable in communicating with a chatbot capable framework over the internet.

There is also provided a computer program comprising instructions which when executed on at least one processor of the user device according to embodiments herein, cause the at least one processor to carry out the method previously described. Also a carrier containing the computer program is provided, wherein the carrier is one of a computer readable storage medium; an electronic signal, optical signal or a radio signal.

Below is described a scenario where embodiments of the present invention are employed. In this scenario, a user wants to know information about roaming in Spain and from there additional information about specific charging for specific numbers to call. The user drops out of dialogue on one chat platform on one device and continues it later on another device with another chat platform on the same place or stage where the dialogue stopped. Each message belonging to the dialogue with a framework capable bot is identified using a dialogue id and a flow marker. The flow marker is a unique id that identifies where in a dialogue the conversion or dialogue is for the moment. This way, if a dialogue is interrupted, it is continued from the same place (identified by the flow marker) independently of whether it is the same chat platform or a different chat platform.

Start: Dialogue id=xxx
  User opens chatbot application A on client A.
  1) User says: "Hi".
  Flow marker 1.0.0.0.0
  2) Bot says: "what can/help you with"
  Flow marker 1.0.0.0.1
  3) User says: "I will travel to Spain"
  Flow marker 1.0.0.0.2
  4) Bot says: "Do you need to know about roaming costs in Spain"
  Flow marker 1.1.0.0.0

5) Use says: "Yes, I need to know if there is 4G coverage in Malaga"
Flow marker 1.2.0.0.1
6) Bot says: "Between which date will you be in Spain"
Flow marker 1.3.0.0.0
7) Use says: "December 23$^{rd}$ to 1$^{st}$ January"
Flow marker 1.3.0.0.1
8) Bot says: "The prices are the same for all roaming operators in Spain (voice call 0.5 Euro/Min, SMS 1 Euro each, data 0.5 Euro/Mb)"
Flow marker 1.3.0.0.2
9) Use says: "Can/call home to +46 771XXXXX with that rate"
Flow marker 1.3.0.0.3
10) Bot says: "Is that a premium rate number?"
Flow marker 1.4.0.0.0
11) Bot says: "If it is not a premium number the charge is 0.5 Euro/min"
Flow marker 1.4.0.0.1
12) Bot says: "If it is a premium number the charge is 1.5 Euro/min"
Flow marker 1.4.0.0.1
13) Bot says: "Should/check the rate to call +46 771XXXXX from Spain"
Flow marker 1.5.0.0.0
14) User says: "yes, thanks"
Flow marker 1.5.0.0.1
15) Bot says: "To call that number the rate from Spain is 1.5 Euro/min"
Flow marker 1.5.0.0.2
User opens chatbot application B on client B.
16) Use says: "Hi"
Flow marker 1.6.0.0.0

The user gets prompted with the ongoing dialogue (topic: "Roaming in Spain"). Note here that the user is first identified. This may be done by the user entering credentials or a specific identifier or code. This is performed to relate to the previous ongoing dialogue. If the bot determines that the credentials are valid, the bot finds the dialogue identifier and flow marker 1.5.0.0.2 and can continue where the discussion ended, etc.

The embodiments herein are also applicable in the case where several dialogue flows are active at the same time. For example, one for booking a flight and one for booking a hotel-room. The flows are active within a given configurable time (set by the service operator or user) that is applicable per area of discussion or depending on the service itself. The user can pick up any of these discussions on the same chat platform or another chat platform and continue where it got interrupted. As in the previous example, the content of each dialogue is identified by a unique flow marker.

It should be noted that the embodiments herein are also applicable for user-bot dialogues that take place within a same chat platform. This may be the case if for some reason a dialogue is interrupted, either manually or because of some other issue. The example below illustrates this scenario.

User starts dialogue with support chatbot on e.g. home PC on chat application A.
1) User: "I have a problem with the broadband TV"
Flow marker 1.0.0.0.0
2) Bot: "What is your customer ID"
Flow marker 1.1.0.0.0
3) User: "Customer IF is 5555"
Flow marker 1.1.0.0.1
4) Bot: "Can you see an image on the TV"
Flow marker 1.2.0.0.0

5) User: "No"
Flow marker 1.3.0.0.0
6) Bot: "Do you have a working internet connection to your TV"
Flow marker 1.3.0.0.1
7) User: "No"
Flow marker 1.3.0.0.2
8) Bot: "Try to restart your modem, this will break the chat"
Flow marker 1.3.0.0.3
Here an identification information (transfer identifier) or a code is generated by the support chatbot.
9) Bot: "Use this code: TV123 to continue chat".
Flow marker 1.4.0.0.0
This code is sent to the user and the user restarts the modem. The user then connects to the support chatbot again from the same chat application and inputs the transfer identifier or code to pick up the session where the user left off.
10) Bot: "Did the restart fix the problem?"
Flow marker 1.5.0.0.0
If the answer from the user is "yes", the chatbot may be stopped or be continued using another topic. If the answer is "no" the troubleshooting continues with the support chatbot.

In the above case, positions of the flow together with input data from the user are stored in a database or persistent memory. This will allow the session to be picked-up where the user left in case the communication is disrupted and the dynamic memory is discarded. Note that the user may have several flows (as previously described), e.g., one for problem with the TV and one with issues with, e.g., invoice or IP telephony etc.

Figure 8:
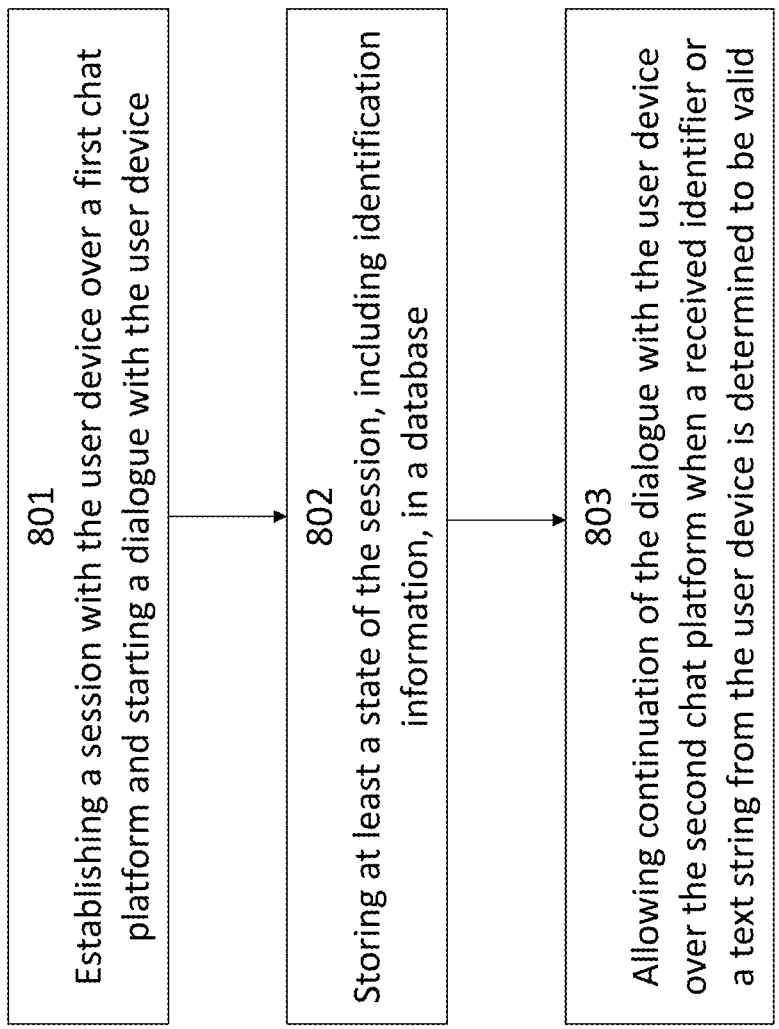
FIG. 8 illustrates a flowchart of a method performed by a chatbot capable framework according to an embodiment herein.

Referring to FIG. 8 there is depicted a flowchart of a method performed by a chatbot capable framework for providing continuity in chat communications with a user device in a network, according to previously described embodiments.

Since the user device established session(s) with the chatbot framework, similarly the chatbot framework also establishes the session(s) with the user device. The initiation of the establishment can be performed by the user device or the chatbot framework. As an example, a user may visit a support website and a chatbot dialogue may popup asking the user, e.g., "what can I help you with?" The main steps of the method performed by the chatbot capable framework comprise:

(801) establishing a session with a user device over a first chat platform associated with a first chat application and starting a dialogue with the user device;

(802) storing at least a state of the session in a database, wherein the session state includes identification information;

(803) establishing a new session with the user device over a second chat platform associated with a second chat application, wherein the new session is established after the user device or the chatbot capable framework initiated transfer of the dialogue from the first chat platform to the second chat platform; and (804) allowing continuation of the dialogue with the user device over the second chat platform when a identifier or a text string received from the user device is determined to be valid.

Figure 9:
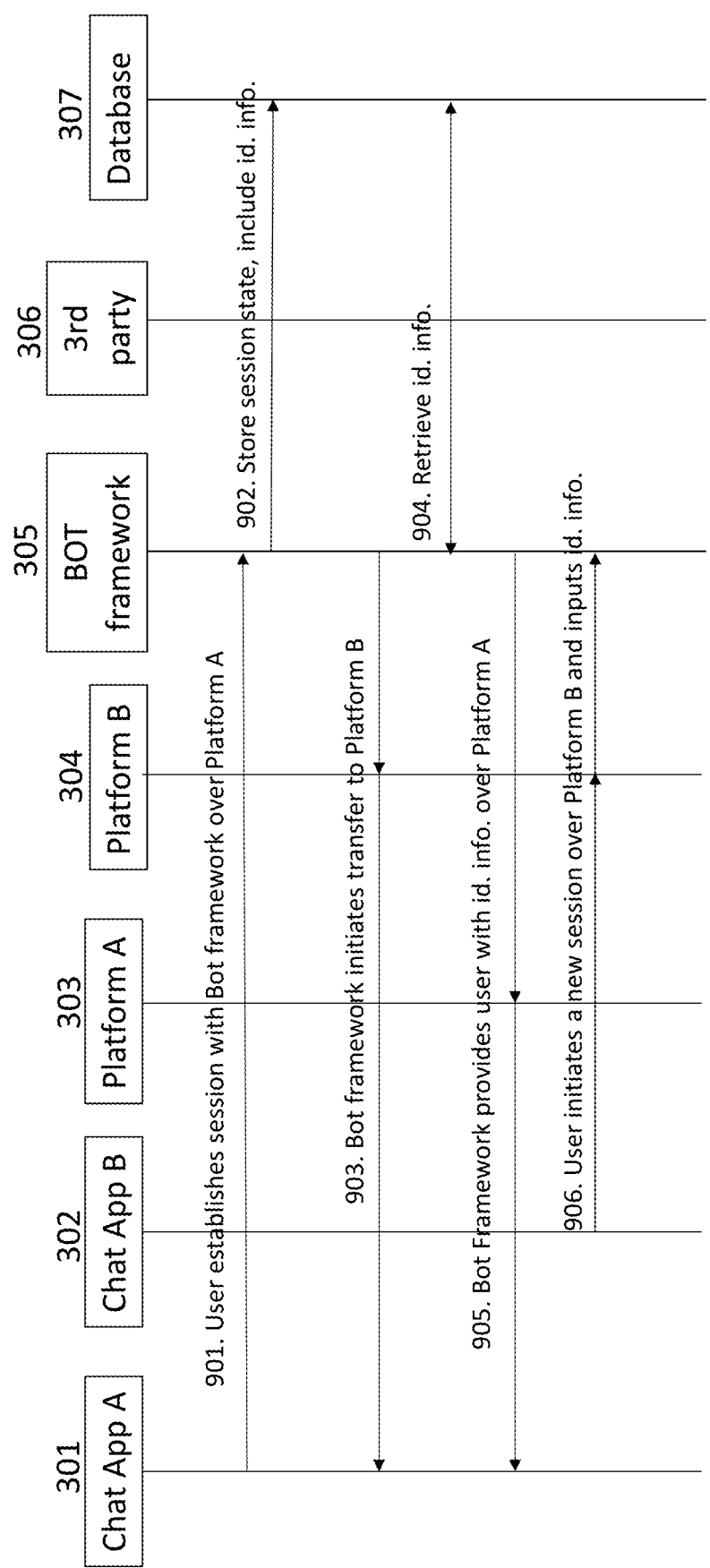
FIG. 9 is an example of a diagram depicting a transfer of a dialogue/session initiated by the chatbot framework according to an embodiment herein.

Referring to FIG. 9 there is illustrated an example scenario when the bot framework 305 initiates transfer to platform B.

The actions performed include:
(901) The user device establishing a session with bot framework 305 over platform A 303

(902) The bot framework 305 storing a state of the session or dialogue in database 307 together with identification information (id. info.).

(903) The bot framework 305 initiating transfer of the session or dialogue to Platform B 304.

(904) The bot framework 305 retrieving from the database 307 the stored id. info. related to the ongoing dialogue.

(905) The bot framework 305 provides to chat application A 301 of the user device the id. info. over platform A, and (906) the user initiates a new session using chat application B 302 over Platform B 304 and inputs the received id. info.

The bot framework 305 then allows continuation of dialogue over chat platform B 304 where it stopped at chat platform A 303

As previously described, the chatbot framework may generate the identification information including the identifier. If the chatbot framework receives the same (or a matching) identifier (or id. info.) as the one transmitted, the identifier is determined to be valid and the dialogue is allowed to continue with the user device over the second chat platform.

Note that instead of an id. info. a text string may be used/inputted by the user and transmitted to the chatbot framework. As in previously described embodiment, when the chatbot framework identifies the received text string and relates that with a user id previously stored in the database, the chatbot framework considers the text string to be valid and allows the dialogue (or bot communications) to continue where it stopped at the first chat platform.

Additional details regarding the actions performed by the chatbot capable framework have already been described and need not be repeated.

There is also provided a chatbot capable framework 305 that can be controlled by a processor of an application server or servers, the chatbot capable framework being configured to: establish a session with a user device over a first chat platform 303 associated with a first chat application 301 and start a dialogue with the user device; store at least a state of the session in a database, wherein the session state includes identification information; establish a new session with the user device over a second chat platform 304 associated with a second chat application 302, wherein the new session is established after the user device or the chatbot capable framework initiated transfer of the dialogue from the first chat platform 303 to the second chat platform 304; and allow continuation of the dialogue with the user device over the second chat platform 304 when an identifier or a text string received from the user device is determined to be valid.

The chatbot capable framework is configured to generate the identification information including the identifier, wherein the identifier is transmitted or provided to the user device, wherein the received identifier from the user device is determined to be valid when it matches the identifier transmitted to the user device. Alternatively, the chatbot capable framework is configured to identify the received text string and relates that with a user id stored in the database 307, and if this is valid, allowing the dialogue to continue where it stopped at the first chat platform.

The described embodiments of the present invention can be realized in hardware, software, or a combination of hardware and software. A system can be realized in a centralized fashion in one computer system, or in a distributed fashion where different elements are spread across several interconnected computer systems. Any kind of computer system or other apparatus adapted for carrying out the methods described herein is suited. For example the chatbot capable framework may be controlled by a processor of a computer system of an application server. The computer program when being loaded and executed by the processor carries out the method described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 3G, 4G, 5G, WiMax etc.

The invention claimed is:

1. A method for providing continuity in chat communications between a user device and a chatbot capable framework in a network, the method comprising:

the user device establishing a session with the chatbot capable framework over a first chat platform associated with a first chat application, and starting a dialogue with the chatbot capable framework, the dialogue being stored by the framework;

the framework storing a state of the session in a database, wherein the session state includes identification information identifying the dialogue;

the user device initiating a transfer of the dialogue to a second chat platform associated with a second chat application;

the framework retrieving, from the database, the previously stored identification information, and providing the user device with the identification information over the first chat platform;

the user device initiating a new session with the chatbot capable framework over the second chat platform associated with the second chat application and inputting the identification information for continuing the dialogue where the dialogue stopped at the first chat platform;

the user device providing at least one of user identification (id) and credentials, the credentials including username and password, required by the second chat application, for retrieving the stored dialogue from the framework over the second chat platform; and the second chat platform formatting messages of the retrieved dialogue to the format supported by the second chat application before sending said messages to the second chat application of the user device.

2. The method according to claim 1 wherein the identification information is at least one of generated and constructed by the chatbot capable framework.

3. The method according to claim 1 further comprising:
retrieving, by the framework, the session state stored in the database by using the stored identification information identifying the dialogue, and providing the dialogue to the second chat platform.

4. A method for providing continuity in chat communications between a user device and a chatbot capable framework in a network, the method comprising:
the user device generating an identification information from a user id, together with a user defined text string;
the user device establishing a session with the chatbot capable framework over a first chat platform associated with a first chat application, and starting a dialogue with the chatbot capable framework, the dialogue being stored by the framework;
the framework storing, in a database, a state of the session together with the generated identification information and the user id;
the user device initiating a transfer of the dialogue to a second chat platform associated with a second chat application;
the framework retrieving the stored identification information associated with the dialogue;
the user device initiating a new session with the framework over the second chat platform associated with the second chat application, and inputting the user defined text string;
the framework identifying the inputted text string and relating the inputted text string with the stored user id, for allowing the dialogue to continue where the dialogue stopped at the first chat platform;
the user device providing at least one of user identification (id) and credentials, the credentials including username and password, required by the second chat application, for retrieving the stored dialogue from the framework over the second chat platform; and
the second chat platform formatting messages of the dialogue to a format supported by the second chat application before sending said messages to the second chat application of the user device.

5. A method performed by a user device, for providing continuity in chat communications between the user device and a chatbot capable framework in a network, the method comprising:
establishing a session with the chatbot capable framework over a first chat platform associated with a first chat application, and starting a dialogue with the chatbot capable framework, the dialogue being stored by the framework;
initiating a transfer of the dialogue to a second chat platform associated with a second chat application;
initiating a new session with the chatbot capable framework over the second chat platform associated with the second chat application, and inputting identification information for continuing the dialogue where the dialogue stopped at the first chat platform;
providing at least one of user identification (id) and credentials, the credentials including username and password, required by the second chat application, for retrieving the stored dialogue from the framework over the second chat platform; and
the second chat platform formatting messages of the dialogue to a format supported by the second chat application before sending said messages to the second chat application of the user device.

6. The method according to claim 5 wherein the identification information includes a unique identifier identifying the dialogue, and, further comprising:
retrieving said identification information from the chatbot capable framework.

7. The method according to claim 5 wherein the identification information is generated by the user device and includes at least a user defined text string.

8. A method performed by a chatbot capable framework for providing continuity in chat communications with a user device in a network, the method, the method comprising:
establishing a session with a user device over a first chat platform associated with a first chat application and starting a dialogue with the user device, the dialogue being stored by the framework;
storing at least a state of the session in a database, wherein the session state includes identification information;
retrieving, from the database, the previously stored identification information, and providing the user device with the identification information over the first chat platform;
establishing a new session with the user device over a second chat platform associated with a second chat application, wherein the new session is established after at least one of the user device and the chatbot capable framework initiated transfer of the dialogue from the first chat platform to the second chat platform;
allowing continuation of the dialogue with the user device over the second chat platform when at least one of an identifier and a text string received from the user device is determined to be valid;
receiving, from the user device, at least one of user identification (id) and credentials, the credentials including username and password, required by the second chat application, for retrieving the stored dialogue from the framework over the second chat platform; and
the second chat platform formatting messages of the dialogue to a format supported by the second chat application before sending said messages to the second chat application of the user device.

9. The method according to claim 8 further comprising: generating the identification information including the identifier, wherein the identifier is at least one of transmitted and provided to the user device.

10. The method according to claim 9 wherein the received identifier from the user device is determined valid when it matches the identifier transmitted to the user device.

11. The method according to claim 8 further comprising:
identifying the received text string and relating the received text string with a user id stored in the database, and if the received text string is valid, allowing the dialogue to continue where the dialogue stopped at the first chat platform.

12. A user device for providing continuity in chat communications between the user device and a chatbot capable framework in a network, the user device comprising a processor and a memory, said memory containing instructions executable by the processor, wherein the user device is operative to:
establish a session with the chatbot capable framework over a first chat platform associated with a first chat application, and start a dialogue with the chatbot capable framework, the dialogue being stored by the framework;
initiate a transfer of the dialogue to a second chat platform associated with a second chat application;
initiate a new session with the chatbot capable framework over the second chat platform associated with the second chat application, and inputting identification information for continuing the dialogue where the dialogue stopped at the first chat platform;

provide at least one of user identification (id) and credentials, the credentials including username and password, required by the second chat application, for retrieving the stored dialogue from the framework over the second chat platform; and the second chat platform configured to format messages of the dialogue to a format supported by the second chat application before sending said messages to the second chat application of the user device.

13. The user device according to claim 12 wherein the identification information includes a unique identifier identifying the dialogue, and said identification information is retrieved from the chatbot capable framework.

14. The user device according to claim 12 wherein the identification information is generated by the user device and includes at least a user defined text string.

15. A chatbot capable framework for providing continuity in chat communications with a user device in a network, the framework configured to:

establish, by a processor of at least one application server, said processor controlling the framework, a session with a user device over a first chat platform associated with a first chat application and start a dialogue with the user device, the dialogue being stored by the framework;

store, by the processor, at least a state of the session in a database, wherein the session state includes identification information;

retrieve, by the processor, from the database, the previously stored identification information, and provide, by the processor, the user device with the identification information over the first chat platform;

establish, by the processor, a new session with the user device over a second chat platform associated with a second chat application, wherein the new session is established after at least one of the user device and the chatbot capable framework initiated transfer of the dialogue from the first chat platform to the second chat platform;

allow, by the processor, continuation of the dialogue with the user device over the second chat platform when at least one of an identifier and a text string received from the user device is determined to be valid, the user device providing at least one of user identification (id) and credentials, the credentials including username and password, required by the second chat application, for retrieving the stored dialogue from the framework over the second chat platform; and the second chat platform configured to format messages of the dialogue to a format supported by the second chat application before sending said messages to the second chat application of the user device.

16. The chatbot capable framework according to claim 15, further configured to generate, by the processor, the identification information including the identifier, wherein the identifier is at least one of transmitted and provided to the user device.

17. The chatbot capable framework according to claim 15 wherein the received identifier from the user device is determined to be valid when it matches the identifier transmitted to the user device.

18. The chatbot capable framework according to claim 15, further configured to identify, by the processor, the received text string and relating the received text string with a user id stored in the database, and if the received text string is valid, allowing the dialogue to continue where the dialogue stopped at the first chat platform.

* * * * *